United States Patent Office 2,939,920

Patented June 7, 1960

2,939,920

MAGNETIC HEADS FOR RECORDING AND REPRODUCING SIGNALS

Hans-Otto G. Leilich, Munich, Germany, assignor to Stifterverband für die deutsche Wissenschaft e.V., Essen-Bredeney, Germany Filed Dec. 23, 1954, Ser. No. 477,256

Claims priority, application Germany Dec. 28, 1953

6 Claims. (Cl. 179—100.2)

The invention relates to magnetic heads and is more particularly concerned with heads for magnetically recording and reproducing signals in form of small magnetic dots on a fast moving signal carrier for use in magnetic storage devices of electronic computers and calculators.

It is an object of the present invention to provide a magnetic head for producing a large number of signs or signals per unit length in the direction of movement of the signal carrier and to form the magnetic head in such a manner that its dimensions in the direction of movement of the signal carrier as well as vertically thereto are as small as possible so that a large number of magnetic heads may be arranged within a restricted space. The magnetic carrier may be arranged at the periphery of a rotating drum so that it moves in tangential direction while the direction vertically thereto is parallel to the axis of the drum.

It is a further object of the invention to provide a magnetic head producing a magnetic recording or reproducing field which is focussed as sharply as possible in the tangential direction so that a large number of mutually independent signals may be recorded on the circular trace. The dimension of the magnetic field in axial direction should not be to short in order that the field may comprise sufficient energy. In general a magnetic field in the shape of a knife edge is desirable in which the edge of the knife is lying in axial direction.

It is a further object of the invention to provide a magnetic head adapted to fulfill these requirements and which is as small as possible in axial as well as in tangential direction so that a large number of heads can be arranged over the circumference of the magnetic drum.

The magnetic heads of the present invention should be well distinguished from the known sound heads, used for sound recording and reproduction inasmuch as the magnetic heads of the present invention are designed for higher recording and reproducing speeds and the magnetic field is focussed more sharply while at the same time the heads do not touch the magnetic carrier, a small distance or air gap being provided between the head and the carrier. The sound heads are designed usually in such a manner that a linear function exists between the current in the winding and the magnetic effect in the sound carrier; this is, however, not necessary for the purposes of the invention and the magnetic heads may be designed in such a manner that this function is non-linear.

It is a further object of the invention to provide a magnetic head for reproducing a signal when the polarity of a dot shaped magnetization at a well defined narrowly limited space of the signal carrier changes.

According to the invention a loop or core of highly permeable magnetic material is fixedly held near the gap by cylindrical or conical supporting means. This supporting structure in which the loop can produce its full magnetic effect has the advantage that the dimensions of the gap are exactly defined and stable so that the magnetic head produces a sharply focussed magnetic field at a well defined location of the signal carrier.

According to the invention the magnetic loop carries a coil comprising a high number of windings so that a transformer in the immediate neighborhood of the magnetic head can be avoided and connecting lines having a length of several feet may be employed in connection with this head.

According to the present invention the holding means may comprise clamping jaws holding the loop by pressure of a clamping member for instance a clamping ring which is simply pushed over the holding means so that the use of screws is avoided.

The sensitivity of the magnetic head may be increased according to the invention by including a number of thin sheets of a highly permeable material in the loop, said sheets being formed and arranged in such a manner, that the number of sheets increases with the distance from the gap.

Other objects, advantages, and features of the present invention will become more fully apparent from the following description of preferred embodiments thereof taken in conjunction with the appended drawings, in which.

Figure 1:
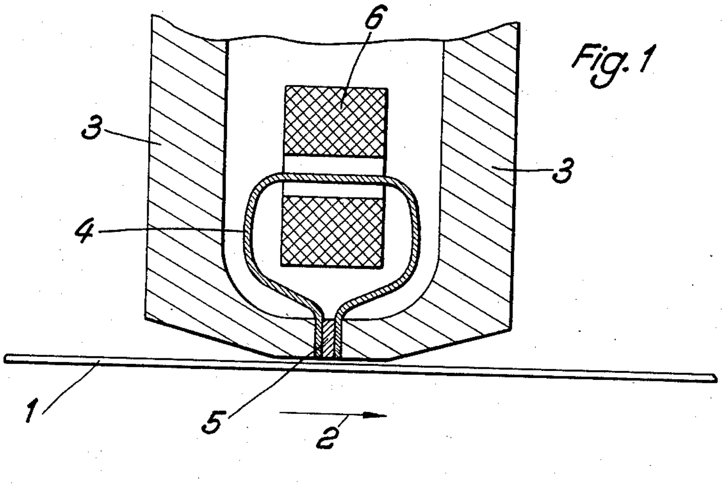
Fig. 1 is a schematic cross-section through the lower end of the magnetic head.

Referring first to Fig. 1 the magnetic head is arranged near a signal carrier 1 moving in the direction of the arrow 2 but separated from the head by an air gap so that it is not touching the magnetic head. The air gap may have a dimension of 0.030±0.005 mm. between the head and carrier. The head includes clamping jaws 3 supporting the loop or core 4 of magnetic material, and a spacer element 5 consisting of non-magnetic material arranged in the gap between the ends or poles of the loop. The poles of the loop have a width of approximately 0.1 mm. measured at the point lying adjacent to the signal carrier and including the spacer element 5. The loop 4 carries a coil 6. The coil 6 may have 50 windings of copper wire so that the head has an impedance of 70 ohms.

Figure 2:
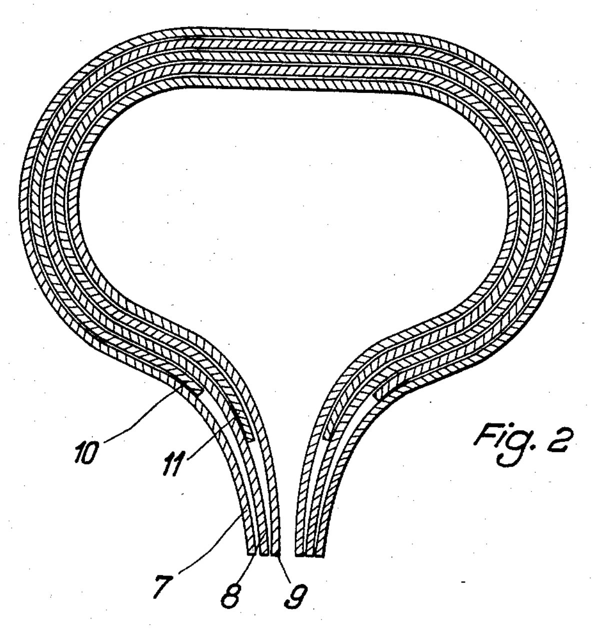
Fig. 2 is a section through a loop or core consisting of a number of strips of sheet metal.

The loop 4 is shown in Fig. 2 on an enlarged scale. It consists of a number of strips 7, 8 and 9 of sheet metal. These strips extend up to the gap of the loop. The loop includes furthermore strips 10 and 11 ending a short distance from the gap. The strips 10 and 11 have a shorter length than the strips 7, 8 and 9 so that the number of strips increases with increasing distance from the gap.

Figures 3, 4, 5, 6:
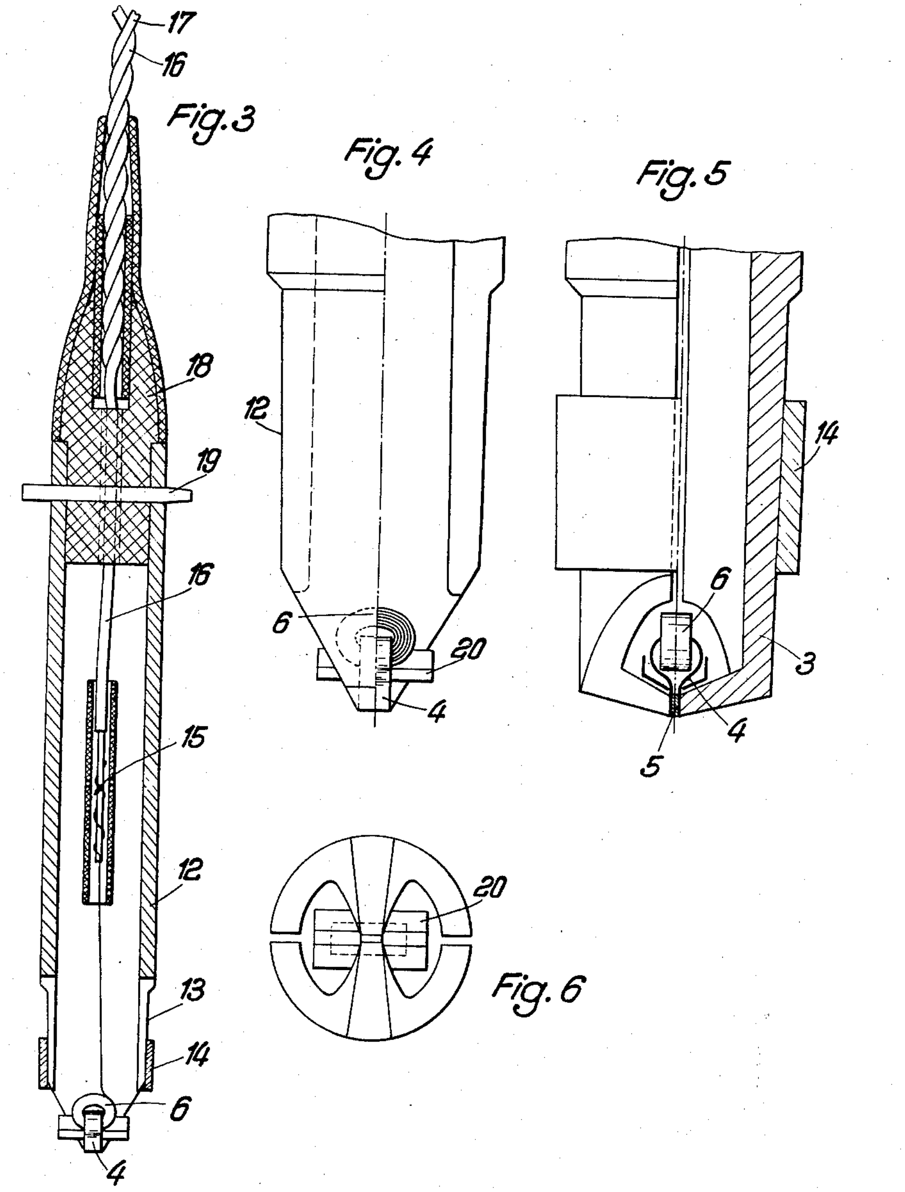
Fig. 3 is a longitudinal section through the magnetic head with the supporting member and Figs. 4, 5 and 6 show longitudinal sections and a ground plan of the magnetic head.

Fig. 3 shows a section through the complete head having the form of a cylindric rod with a diameter similar to that of a lead pencil. The head comprises a metallic casing 12 slotted at the lower end and provided with a tapering conical outer surface 13 carrying a clamping ring 14. The ring 14 is pushed so far upwardly over the tapering surface that it exerts a pressure upon the clamping jaws sufficient to secure the loop 4 in its place and to hold it stationary under all conditions of use. The clamping jaws grip the loop near its poles or ends so that these ends cannot vibrate or change their positions under the influence of forces acting upon the loop during the operation of the heads.

The coil 6 has connecting wires extending upwardly into the casing 12. These wires are soldered at the places 15 to two connections 16 and 17 consisting for instance of Litz wire and extending outwardly of the casing. The casing 12 is closed at its upper end by an insulating element 18 having holes for receiving the connecting wires 16 and 17. The insulating element 18 is fastened to the casing by a conical pin 19 serving at the same time for the adjustment of the magnetic head in the boring of a head carrier (not shown) so that the magnetic head may be aligned and exactly adjusted with regard to the signal carrier. The complete magnetic head has a very small diameter of for instance ¼" so that a large number of heads may be arranged in close relation on the head carrier.

Figs. 4, 5 and 6 show the special shape of the casing 12 at the lower end thereof. The casing has a transverse opening for receiving the coil and the upper part of the magnetic loop. A metal screen 20 is arranged between the loop and the casing. This screen has the effect that the magnetic field is concentrated in the gap when sudden changes of magnetization occur and shall avoid the disadvantages of a stray flux.

It will be understood, that many variations of the above described head are possible without departing from the scope of the present invention.

What I claim is:

1. A magnetic head for producing minute magnetic signs on a fast moving magnetizable substantially flat signal carrier, comprising a loop of magnetic material of high permeability, a gap in said loop, a spacer in said gap, two poles formed by the ends of said magnetic material adjacent said spacer, an elongated non-magnetic holding element in form of a hollow rod of substantially cylindrical cross-section, its axis being positioned substantially perpendicular to the signal carrier, said hollow rod having a portion of reduced outer diameter at the end directed towards the signal carrier, pole pieces adapted to clamp said poles at the extremity of said portion of reduced diameter, a slot separating said pole pieces, and extending throughout said portion of reduced diameter for receiving the loop and clamping means disposed in slip-on relation on the portion of reduced outer diameter of said holding element, said clamping means having dimensions not to exceed a cylindrical surface coincident with the outer surface of said hollow rod.

2. A magnetic head for producing minute magnetic signs on a fast moving magnetizable substantially flat signal carrier, comprising a loop of magnetic material of high permeability, a gap in said loop, a spacer in said gap, two poles formed by the ends of said magnetic material adjacent said spacer, an elongated non-magnetic holding element in form of a hollow rod of substantially cylindrical cross-section, its axis being positioned substantially perpendicular to the signal carrier, said hollow rod having a portion of reduced outer diameter at the end directed towards the signal carrier, pole pieces adapted to clamp said poles at the extremity of said portion of reduced diameter, a slot separating said pole pieces and extending throughout said portion of reduced outer diameter for receiving the loop and clamping means disposed in slip-on relation on the portion of reduced outer diameter of said holding element, said clamping means having dimensions not to exceed a cylindrical surface coincident with the outer surface of said hollow rod, a coil on said loop, the largest dimension of said coil extending in the direction of the longitudinal axis of said holding element.

3. A magnetic head for producing minute magnetic signs on a fast moving magnetizable substantially flat signal carrier, comprising a loop of magnetic material of high permeability, a gap in said loop, a spacer in said gap, two poles formed by the ends of said magnetic material adjacent said spacer, an elongated non-magnetic holding element in form of a hollow rod of substantially cylindrical cross-section, its axis being positioned substantially perpendicular to the signal carrier, said hollow rod having a portion with a tapering surface of reduced outer diameter at the end directed towards the signal carrier, pole pieces adapted to clamp said poles at the extremity of said portion of reduced diameter, a slot separating said pole pieces and extending throughout said tapering portion for receiving the loop and a clamping ring disposed coaxially on and adapted to engage said tapering surface thereby to depress said pole pieces tightly against the poles of said loop.

4. A magnetic head for producing minute magnetic signs on a fast moving magnetizable substantially flat signal carrier, comprising a loop of magnetic material of high permeability, a gap in said loop, a spacer in said gap, two poles formed by the ends of said magnetic material adjacent said spacer, an elongated non-magnetic holding element in form of a hollow rod of substantially cylindrical cross-section, its axis being positioned substantially perpendicular to the signal carrier, said hollow rod having a portion of reduced outer diameter at the end directed towards the signal carrier, pole pieces adapted to clamp said poles at the extremity of said portion of reduced diameter, a slot separating said pole pieces and extending throughout said portion of reduced outer diameter for receiving the loop and clamping means disposed in slip-on relation on the portion of reduced outer diameter of said hollow rod, said clamping means having dimensions to lie within a cylindrical surface coincident with the outer surface of said hollow rod, a coil on said loop, the largest dimension of said coil extending in the direction of the longitudinal axis of said holding element and a metallic shield between the coil and said poles, said shield extending beyond the dimensions of the coil in the direction transverse to the movement of the signal carrier.

5. A magnetic head as in claim 2, wherein said pole pieces are outwardly defined by two pairs of symmetric planes, the respective planes of symmetry of both pairs intersecting at a right angle, said intersection being coaxial with the axis of said hollow rod, one pair of planes being inclined at an angle of substantially 10° to the signal carrier and intersecting to a length which is substantially that of the width of said poles, the other pair of planes being inclined at an angle of substantially 60° to the signal carrier and interescting the ends of said length.

6. A magnetic head as in claim 5, wherein said loop of magnetic material is mounted inside of said pole pieces defined by said two pairs of symmetrical planes.

References Cited in the file of this patent

UNITED STATES PATENTS

| | | |
|---|---|---|
| 739,252 | Ashby | Sept. 15, 1903 |
| 789,679 | Turnbull | May 9, 1905 |
| 2,144,844 | Hickman | Jan. 24, 1939 |
| 2,469,444 | Roys | May 10, 1949 |
| 2,653,189 | Camras | Sept. 22, 1953 |
| 2,668,878 | Munroe | Feb. 9, 1954 |

FOREIGN PATENTS

| | | |
|---|---|---|
| 661,428 | Great Britain | Nov. 21, 1951 |
| 844,674 | Germany | July 24, 1952 |